United States Patent [19]

DiMatteo et al.

[11] 4,402,608
[45] Sep. 6, 1983

[54] ROOM SCANNING SYSTEM USING MULTIPLE CAMERA AND PROJECTOR SENSORS

[75] Inventors: Paul DiMatteo, Huntington; Paul Rademacher, Glen Head, both of N.Y.

[73] Assignee: Solid Photography Inc., Melville, N.Y.

[21] Appl. No.: 193,172

[22] Filed: Oct. 2, 1980

[51] Int. Cl.³ .................... G01B 11/00; G01C 3/00
[52] U.S. Cl. ........................... 356/375; 356/1; 356/376
[58] Field of Search ................ 356/1, 4, 375, 376; 351/4

[56] References Cited

U.S. PATENT DOCUMENTS 3,633,010  1/1972  Svetlichny ........................ 356/4
4,145,991  3/1979  DiMatteo et al. ............... 356/375

OTHER PUBLICATIONS

Gillespie, W. M.; *Land-Surveying*, Part VII, Chapter III, "Obsticals to Measurement," pp. 287–296; dated 1855.

Primary Examiner—R. A. Rosenberger
Attorney, Agent, or Firm—Max Fogiel

[57] ABSTRACT

An arrangement for obtaining three-dimensional position data on surfaces defining a room, and objects enclosed by that room. The room is scanned with a master and slave sensors to determine the three-dimensional profiles of surfaces that are visible to the sensors. A pattern is then projected by the master sensor onto a known surface, and slave sensors spaced from the master sensor search for that pattern. The position of the pattern is determined angularly by each slave sensor, and the projection of the pattern is thereafter discontinued. Each salve sensor then measures the distance to the known surface at that angle with respect to its own coordinate system. This is repeated three times so that three such patterns are located. The position data from all of the sensors are transformed into a single common coordinate system, based upon sensor locations determined by the measurement of the three patterns.

10 Claims, 9 Drawing Figures

ROOM SCANNING SYSTEM USING MULTIPLE CAMERA AND PROJECTOR SENSORS

BACKGROUND OF THE INVENTION

The present invention relates to a system of optical sensors which are arranged to provide 3D position data on a great majority of the surfaces which define a room and the objects enclosed therein. It is particularly important in the present invention to take into account the percentage of the surfaces which can be "seen" by the sensors, and the accuracy to which these "visible" surfaces can be measured. Of second importance is the speed at which the total volume can be scanned.

Whereas scanning systems are known in the art, these are complex and do not provide the accuracy required for obtaining satisfactory results.

Accordingly, it is an object of the present invention to provide a room scanning system from which it is possible to determine the locations of surfaces in space, within the room, with substantially high accuracy.

Another object of the present invention is to provide an arrangement of the foregoing character in which positional data of the surfaces can be obtained within a minimum amount of time.

A further object of the present invention is to provide an arrangement, as described, which is substantially simple in construction and may be economically fabricated.

SUMMARY OF THE INVENTION

The objects of the present invention are achieved by providing an arrangement for obtaining three-dimensional position data on surfaces defining a room and objects therein, by scanning the room with master and slave sensors to determine the three-dimensional profiles of surfaces that are visible to each sensor. Properly merging of data from all sensors requires that the relative positions of the sensors be known. These are determined via a registration process based upon measurements by each sensor of three or more fixed points in space which are visible to all sensors. These points are provided by the master sensor by projecting fixed light patterns on the room surfaces.

The positional data determined by each of the sensors is relative to the coordinate system of each sensor, and this data is stored in memory. The stored three-dimensional data from all sensors is then transformed into a single common coordinate system, based upon their relative positions as calculated during the registration process.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
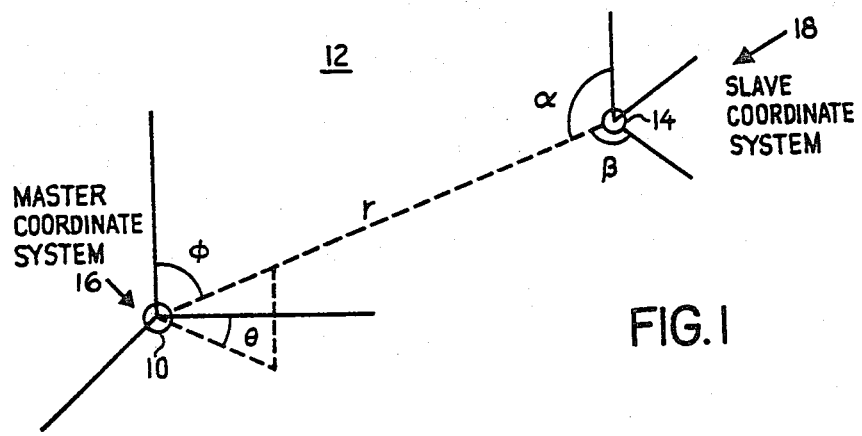
FIG. 1 is a schematic view showing the relationship between the coordinate system of the master sensor and that of the slave sensor.

Visibility to the surfaces in the room is increased by providing multiple sensors distributed about the room in a manner which maximizes visibility to all surfaces. In general, one sensor 10 is located in the center of the room 12 and is called the "master" sensor. Subordinate sensors 14 are located elsewhere to see into areas not visible to the master sensor. These subordinate sensors are denoted as "slave" sensors. All sensors scan the volume and gather 3D position data from the surfaces they can see. This data is initially gathered in the terms of a spherical coordinate system centered at the sensor and oriented according to the sensor orientation. Thus, room data is initially gathered in terms of several different spherical coordinate systems, one for each sensor. In order to properly merge the data from all sensors, a transposition to a single coordinate system is required. That coordinate system will be that defined by the "master" sensor. The required parameters to transpose the "slave" coordinate systems 18 to the "master" coordinate system 16 are defined completely by determining the position and orientation of each "slave" sensor in terms of the "master" sensor coordinate system. This process is referred to as registration.

Registration can be achieved by leaving the master 10 and slave 14 mutually visible to each other in which case slave position and orientation in the master coordinate system is achieved as in FIG. 1.

In this case, r, $\theta$ and $\phi$ are determined by the master sensor 3D sensing capability and define the position of the slave sensor in the master coordinate system. Angles $\alpha$ and $\beta$ are determined by the slave sensor 3D sensing capability and, in conjunction with $\theta$ and $\phi$, determine the orientation of the slave sensor in the master coordinate system.

Figure 2:
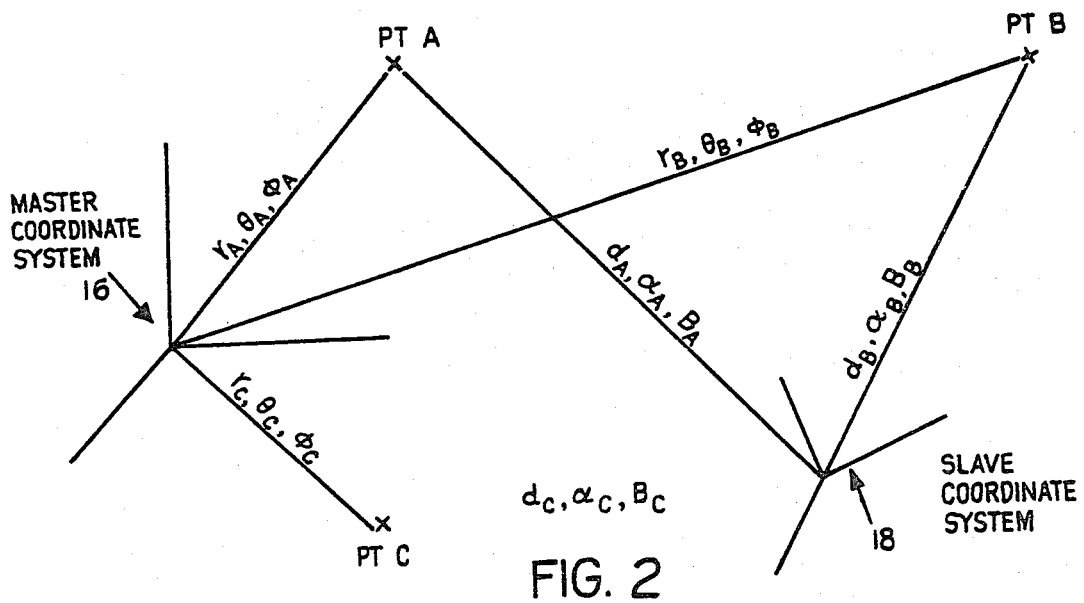
FIG. 2 is a schematic view and shows the geometrical relationships between the coordinate systems and projected points.

There may be conditions under which the master and slave sensors are not intervisible. Registration in these cases can be achieved if three known non-colinear points can be defined in space and are visible to both the master and slave sensors. If the 3D positions of these points can be determined by the 3D sensing capabilities of the master and slave sensors (and in their own coordinate systems ) then the physical relationship of the two coordinate systems is thus also determined. The registration method is depicted in FIG. 2.

Clearly, if r, $\theta$ and $\phi$ are measured by the master sensor, pts A, B & C are located in the master coordinate system. If the slave sensor measures the distances d to the 3 points, then the position of the slave in the master coordinate system is determined as the intersection of 3 spheres. (An ambiguity between 2 positions exists where these two positions are images about a plane through the 3 points A, B & C). The orientation of the slave coordinate system is determined by the measurement of $\alpha$ and $\beta$ to any one point. Measuring $\alpha$ and $\beta$ to the three points provides further data for accuracy enhancement and also resolves the ambiguity cited above. Mathematical algorithms can be developed to optimally weigh the data d, $\alpha$ and $\beta$ based upon the relative positions of the master and slave sensors as well as the three points so as to achieve the greatest accuracy in generating the transformation equations between coordinate systems.

The pts A, B & C that are shown may be called stars. These stars could be physical targets placed about the room as part of the measuring apparatus, or objects of opportunity in the room, whose shape can be recognized by the sensors. The former is an inconvenience while the latter involves highly complex recognition problems for the data processor.

A star can be generated by the master sensor by using its projector to project a pattern or point of light on a room surface visible to the slave sensor. Since this surface position in the master coordinate system is determinable by the master's 3D sensing capabilities, the 3D position of the projected star is also determined in that reference frame (i.e. r, $\theta$ and $\phi$ are known).

The master will continuously project this star on the surface while the slave systems search the volume with their cameras until the star is seen. The star can be automatically recognized and identified once it is detected by a unique ON-OFF code sequence applied by the master projector. All slaves can search for the star simultaneously.

When the star is found and recognized by the slave, its angular position in the slave coordinate system ($\alpha$ and $\beta$) is known. The distance d to the star can then be determined by commanding the master projector to turn off the star and using the 3D sensing capabilities of the slave sensor to determine the distance to the surface at that angle $\alpha$ and $\beta$. This process is done sequentially for each slave sensor, and totally repeated for other stars until 3 stars have been thus generated and measured.

The registration sequence described above is outlined below:

(1) Master sensor scans room to determine 3D profiles of all surfaces visible to it.

(2) Master projector projects star A onto known surface ($r_A$, $\theta_A$ and $\phi_A$ known).

(3) All slaves search for, recognize and locate star A (if visible to slave) and angles $\alpha$ $\beta$ thus determined.

(4) Master projector turns off star.

(5) Slave sensor 1 measures distance to surface at $\alpha$ and $\beta$ using its 3D measurement capability, thus determining $d_A$.

(6) Step 5 is repeated in sequence for all other slaves.

(7) Master projector projects star B onto another surface in a different direction ($r_B$, $\theta_B$ and $\phi_B$ known) and steps 3–6 repeated for this star.

(8) Step 7 repeated for star C.

(9) Should any slave not have by now located and measured 3 stars, step 7 is again repeated until all slaves have measured 3 stars.

The sequence shown requires a central control authority with communication (two way) capability to the sensors. The central control function is provided by a microprocessor located in the master sensor. Communication with the slave sensors can be via radio link.

The selection of star location shall be made by a simple algorithm in the master sensor microprocessor program responsive to a coarse room shape profile provided by step (1). This profile is generated by temporarily storing 3D points at spherical angle spacings as coarse as 10 degrees.

While only 3 stars are required to locate a slave sensor, the use of more stars can appreciably increase the accuracy of the location measurement. Thus, the system accuracy can be further improved at the cost of survey time.

The sequence described above requires orchestration by a central control authority with communication capability to all sensors. This function is provided by the Controller's microcomputer via the common data bus to all sensors. The controller will command the master sensor to project a star in a specific direction and measure and report its position in space. Simultaneously, it commands all slave sensors to search for and locate that star angularly. When the star is detected by a slave sensor, it stops it search and reports star angular position to the Controller, which stores this data in memory. When all slave searches are completed, the Controller commands the master sensor to turn off its projector. It then commands each slave sensor (in sequence) to measure the distance to the surface in the direction in which the star was detected by that sensor and report this distance. After this process is repeated for all required stars, the Controller has in memory the 3D positions in space of all stars in the coordinate systems of each sensor. This data is outputted to the tape memory where the later "off line" processing uses it to properly "register" all sensor coordinate systems. This permits the proper transformation of 3D measurement data from all sensors into a single common coordinate system.

Depth sensing accuracy is determined basically by the angular resolution of both camera 20 and projector 22 and the ratio of maximum sensing distance to the camera/projector baseline. Accuracy optimization can be achieved by adaptively maximizing angular resolution. Parameters to be controlled are:

(1) focus of projected pattern on surface.

(2) camera focus on above projected pattern.

(3) camera projector pointing angles to intersect on surface.

Figure 3B:
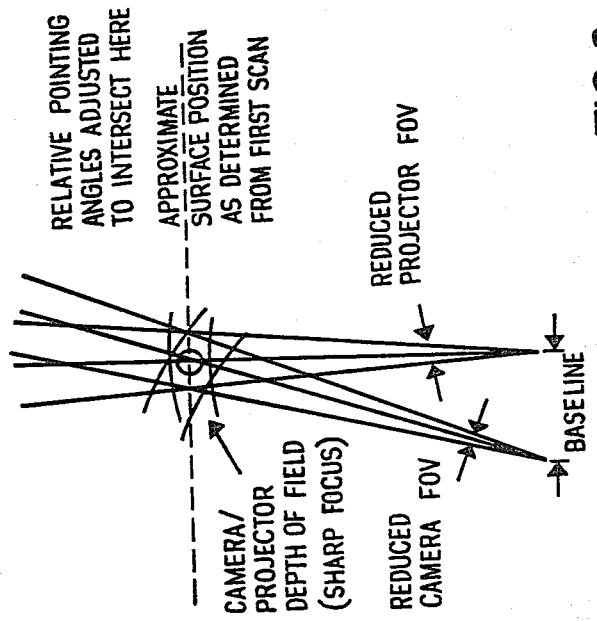
FIG. 3b is a schematic view and shows the scan geometry for high accuracy position determination.
Figure 3A:
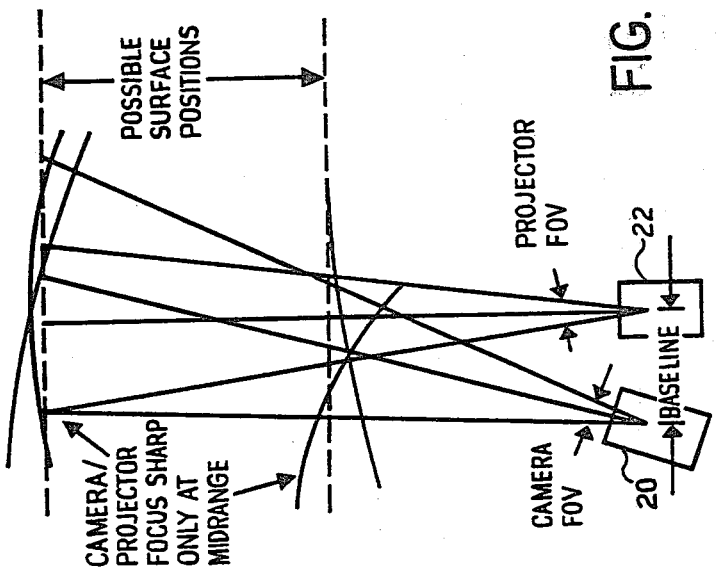
FIG. 3a is a schematic view showing the scan geometry for coarse position data determination.

(4) camera and projector FOV narrowed (i.e. zoom) to be just wide enough to accept uncertainty of surface depth. The first scan geometry (for coarse position determination) versus the second scan geometry for high accuracy is shown in FIG. 3a and 3b, respectively.

The adaptive parameter control described is achieved by a two scan system. The first scan is used to determine the approximate room profile. It uses broad camera and projector fields with nominal focusing and intersection points to provide rapid but coarse position data. Having thus determined the approximate profile, a second scan is used with focus, FOV and intersection parameters optimized to improve the depth accuracy.

The first scan might sample the profile data at intervals of 0.1 radians using a single plane of projected light viewed by an offset camera. With a camera FOV in the order of 0.5 radians, five data points can be gathered per camera frame (1/30th sec). To cover the approximate 1000 pts in the volume, only about 6–7 seconds of scan time is required. The single plane projection technique provides for simple sensing of the depth data so that the coarse room profile can be organized and stored in temporary memory with minimal preprocessing. This data base will then provide the basis for the adaptive parameter optimization during the second scan. Based on this data, at each projection angle during the second scan, the following parameters are adjusted:

(a) projector focal distance at surface
(b) camera focal distance at surface
(c) camera/projector line of sight intersection at surface
(d) camera/projector FOV narrowed appropriately.

Second scan depth data can be obtained using either a single plane or multiple plane projection pattern. If data point space of 0.1 inches at a max distance of 200 inches is desired, then depth data must be sampled at 0.0005 radian intervals. This amounts to $8\pi \times 10^6$ pts in a hemisphere. A single plane projection can gather data at 10,000 pts/sec (300 line-30 frame/sec camera) for a total scan time of 2500 sec. For a multiplane projection, a square matrix of $10^5$ pts can be gathered in 1 sec. Thus, approximately 250 seconds is required to scan the hemisphere.

The master and slave sensors must not scan simultaneously since mutual projection pattern interference might thus result. For sequential scanning, the above scan times must then be multiplied by the number of sensors to arrive at the total time to gather all of the data from the room.

Theoretical system resolution is, for the most part, a function of the camera/projector angular resolution and the length of the sensor baseline (camera-projector distance). The depth resolution ($\Delta s$) is approximately:

$$\Delta s = (S^2 + B^2)/B\Delta\theta$$

where:
s = distance from sensor to surface being measured
B = projector-camera baseline
$\Delta\theta$ = sensor angular resolution This can also be considered as representative of a system accuracy if no area integration is performed. Angular resolution $\Delta\theta$ is also the angular sampling interval. For a sampling interval of ½ milliradian as above, max distance(s) of 200 inches and a baseline of 20 inches, $\Delta s = 1$ inch. Area integration can provide accuracies of a fraction of this value depending on the area of integration selected. For instance, integration over 1 square inch could provide an accuracy improvement approaching 0.1 inches if no systematic errors are involved.

Increasing the baseline (B) will proportionally improve accuracy as will also increasing angular resolution $\Delta\theta$. Each time angular resolution is halved, however, the scan time is increased by a factor of 4. Thus, there is a compromise between system accuracy and scan time.

Figure 4:
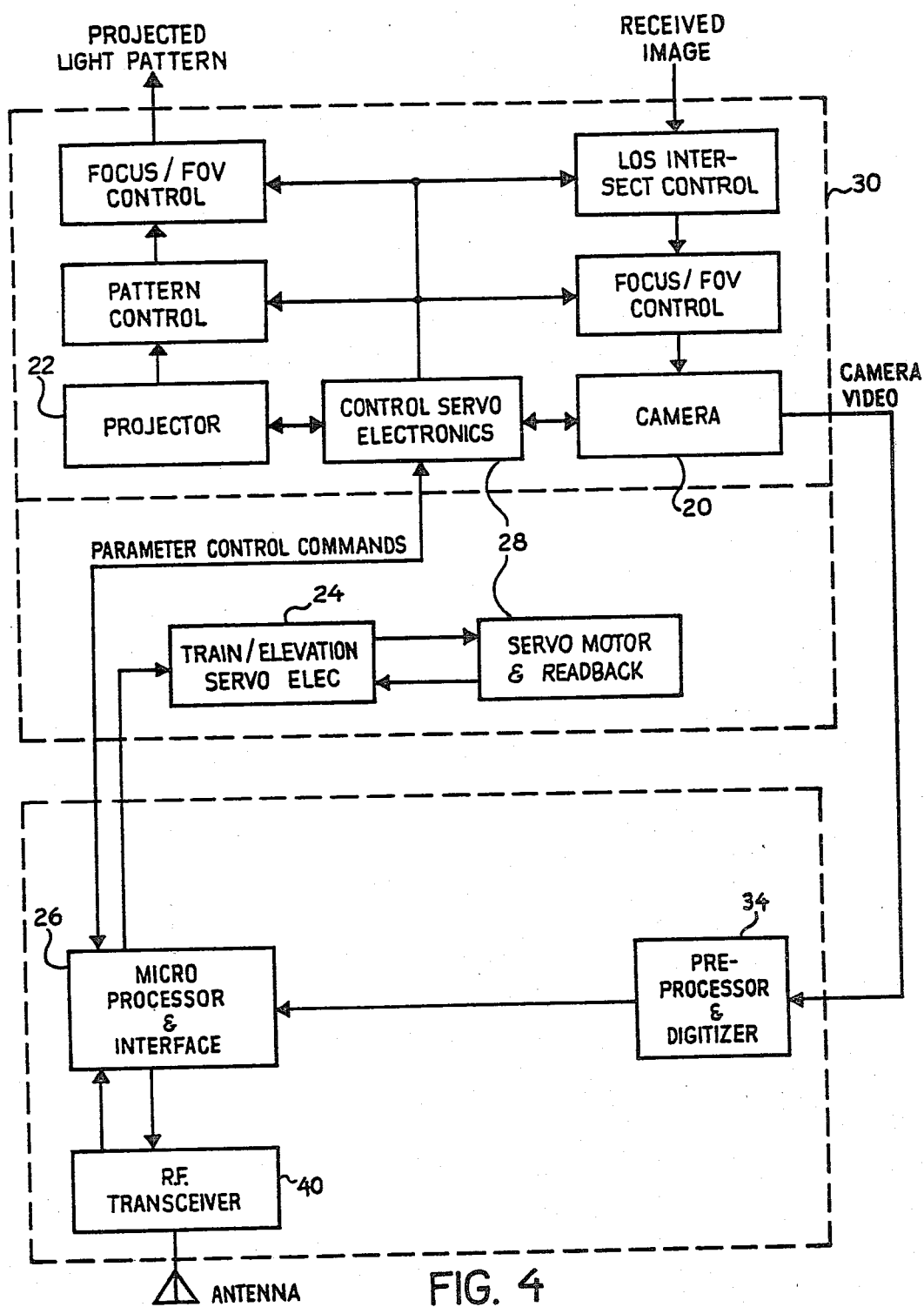
FIG. 4 is a block diagram and shows the construction of the master sensor.

A typical configuration of a sensor is shown in FIG. 4. The sensor pointing position is controlled by a simple elevation and train servo control system 24 directed by pointing instructions from the microprocessor 26. The projector 22, camera 20 and associated optics are located on the sensor head. The electro-mechanical mechanisms 28 to control the optical related parameters and pointing servos are also located on the sensor head 30. These controlled parameters include:
(a) camera focus
(b) camera FOV
(c) projector focus
(d) projector pattern width
(e) projector pattern control
  i.e. spot
  line
  multiline
  OFF
(f) projector/camera LOS (line of sight) intersection.
(g) elevation angle
(h) train angle The video pre-processor 34 filters and digitizes camera video data for transmission to the central controller via the r.f. link. The microprocessor formats this data prior to transmission. The microprocessor in the sensor also provides the control of the master sensor functions, as coordinated by executive commands from the central controller. The R.F. Transceiver 40 provides the communication link between this microprocessor and the central controller.

Figure 5:
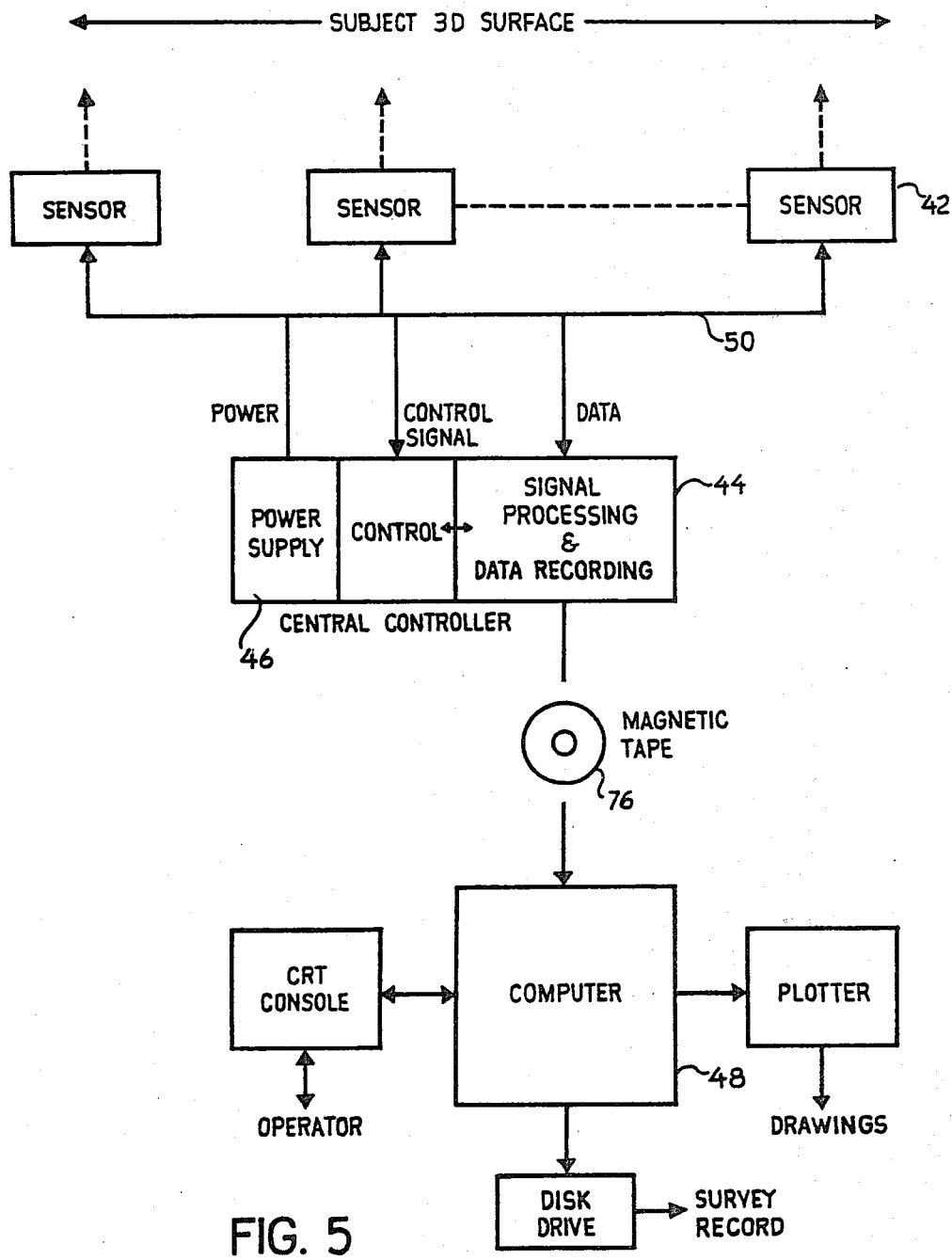
FIG. 5 is a block diagram and shows the essential elements of the arrangement, in accordance with the present invention.

A block diagram of the system is shown in FIG. 5. The portable equipment required to perform the survey aboard a ship includes a number of Sensor units 42 and a central Controller 44 with digital tape recorder. The Controller 44 contains power supplies 46 to provide all power required for its own operation and that of the sensors. It also provides the central control function to orchestrate the operation of the sensors (when required) and format sensor survey data for the tape recorder. This function is provided by a microcomputer 48 and associated digital interface circuits. Connection to the sensors is via a common digital data bus 50. Both units are designed to be rugged and portable, with weight and size compatible with easy manpacking aboard ship. The number of sensors required for any survey task is dependent on the size and make-up of the area to be scanned.

The off-line processing shown in FIG. 5 is carried out by a general purpose computer aided design facility using software generated specifically for this purpose. No new equipment design is necessary. The data tapes generated contain the 3D data gathered by each sensor in its own coordinate system. In addition, registration data which is gathered to locate relative sensor position is also contained on this tape. The latter data is processed in the computer to define the local sensor coordinate systems. Based on these locations, the 3D data gathered by each sensor is transformed into a single common coordinate system and merged to create a single data file describing the surveyed compartment's configuration. Standard programs will enable the operator to "view" the compartment via his graphics terminal. This will permit him to "fill in" any missing data due to sensor shadowing and control the creation of appropriate drawings required. The basic data file describing the compartment can be stored on disk memory for reference at a future time. This file represents a complete three-dimensional record of the surveyed area.

Figure 6:
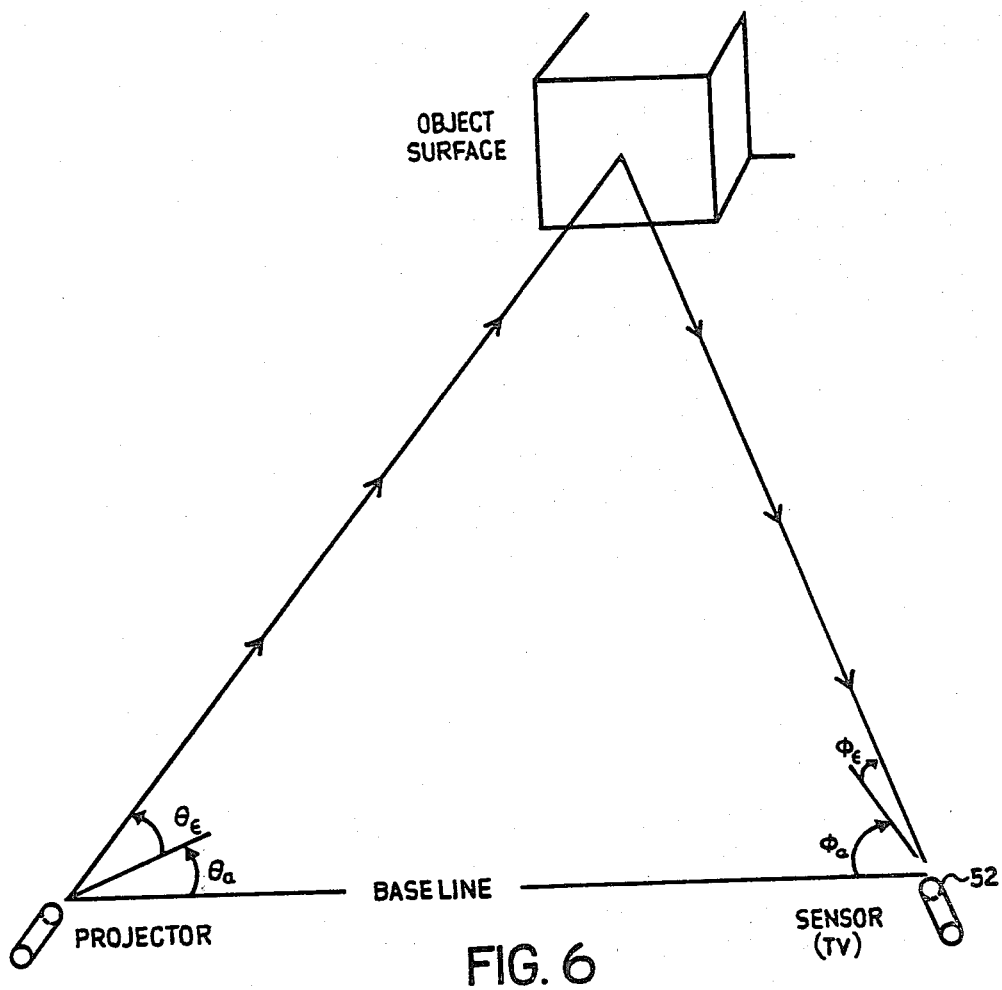
FIG. 6 is a schematic view and shows the triangulation method used in the present invention.
Figure 7:
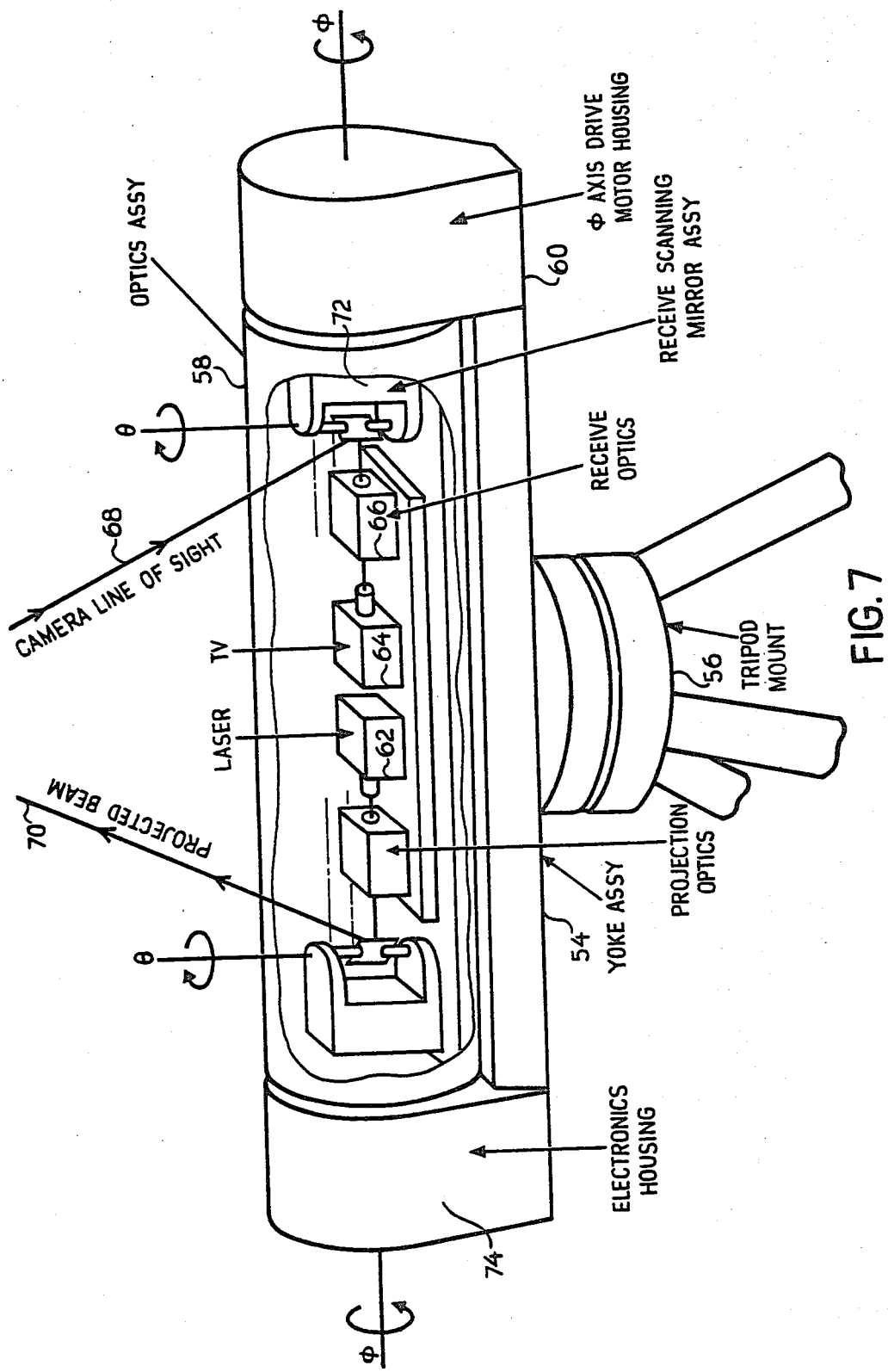
FIG. 7 is a perspective view, with parts broken away, of a sensor.
Figure 8:
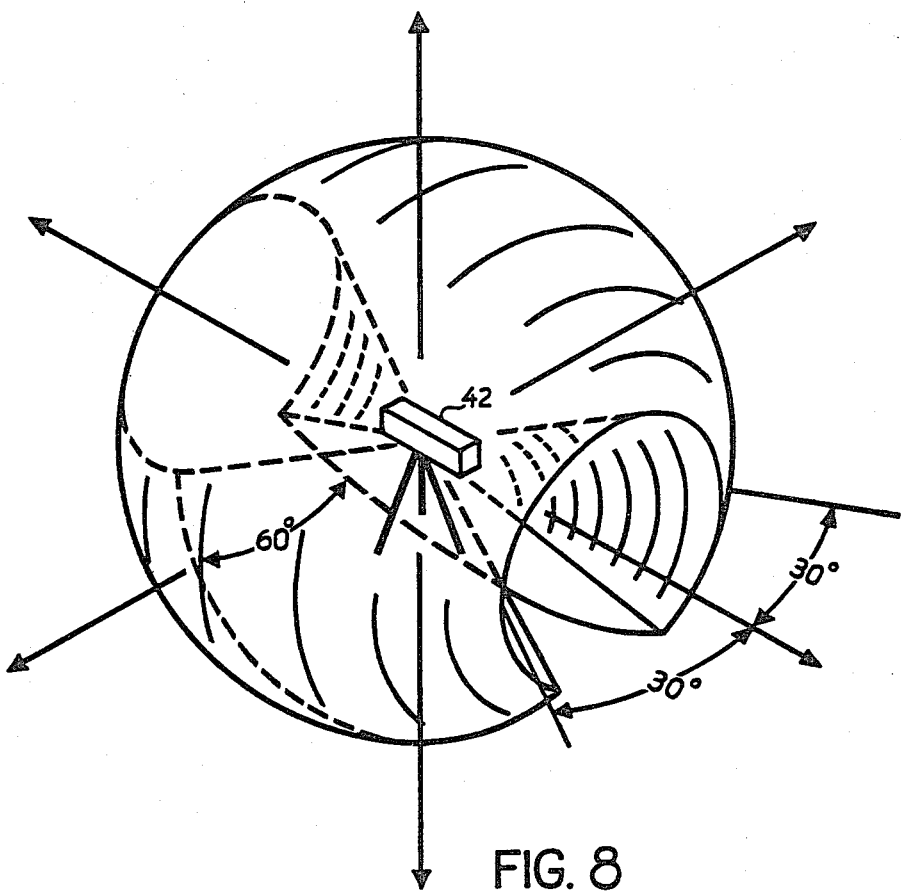
FIG. 8 is a schematic view and shows the volumetric scanning coverage of a single sensor.

The Sensor designed for this application measures 3D surface coordinates by optical triangulation between a projected light beam and the position of its intersection with the surface as sensed by an offset TV camera. The basic principle of this triangulation method is shown in FIG. 6. By scanning the projected beam in two angles in space and following the projected surface image with the TV camera 52 (via a closed loop tracking system), volumetric 3D measurements are made. Measurement accuracy achievable with the triangulation technique shown in FIG. 6 is dependent (among other things) on the length of the "baseline" between projection and camera. The longer this baseline, the better the measurement accuracy. On the other hand, a longer baseline makes the Sensor awkward to handle or fit into some areas. Thus some compromise must be struck between accuracy and Sensor size. The Sensor design established for this function is shown in FIG. 7. The yoke assembly 54 is mounted to the tripod 56 directly. The optics assembly 58 is mounted to the yoke and is rotatable about axis $\phi$ by drive motors 60 and gears in the yoke assembly. The laser projector 62 and TV camera 64, along with associated optics 66, is mounted in the optics assembly. The camera line of sight 68 and projector boresight 70 are directed towards opposite ends of the optics assembly. Scanning mirrors 72 placed at the ends of the optics assembly direct the camera line of sight and projector boresight out towards the surface of interest. By controlling the mirror positions, the beam scanning and camera tracking in angle $\theta$ is achieved. Thus, the two angle $\phi$, $\theta$ scan required for volumetric coverage is implemented. The optics assembly can be rotated about $\phi$ axis by more than 300 degrees before blocking of the beam by the yoke assembly occurs. Scanning in $\theta$ is more restricted since the further the beam is scanned to either side, the smaller becomes the "effective" optical baseline from which to triangulate. At $\pm 60$ degree scan angle, this baseline is reduced by one half, thus doubling measurement errors. This is taken as the maximum scan limits in $\theta$. The resultant volumetric scanning coverage of a single sensor is, therefore, as shown in FIG. 8.

During angular scan, the projector beam is scanned in $\theta$ by its mirror and in $\phi$ by virtue of the entire optical assembly rotated within the yoke. This scan pattern follows a preset uniform format (i.e. scan $\pm 60$ degrees in $\theta$ while incrementing $\phi$). While the beam is scanned, the camera's mirror must be continuously scanned to keep the projected image within the camera's field of view. A closed tracking loop within the Sensor detects the position of the image in the TV field and controls the mirror to keep it centered. At the start of any scan sequence (or at any time should the projected image be lost in the camera's field of view), scanning of the projected beam is stopped, and the camera mirror automatically rotates until the projection is "captured" by the TV. In addition, it is necessary to keep both the projected beam and the camera optimally focused on the scanned surface, thus requiring that the distances to the surface be known. At the same time, these are effectively known via the unique positions of the two mirrors. Thus, mirror positions are converted to distances which drive motors to appropriately adjust the lens systems to retain optimum focus. A small micro-computer and drive electronics in the yoke assembly provides this optical tracking capability. Upon command from the central Controller 44, the microcomputer 48 can direct the Sensor 42 to point its beam and camera at a specific coordinate in space as is required during registration. In addition to the above-described control loops, an automatic light control (ALC) loop is implemented by sensing peak camera video levels and adjusting the camera aperture accordingly. At the angular scan rates contemplated for the Sensor, the update rates for these control loops need only be in the order of 1 Hz, —a small load on the microcomputer. The major portion of the workload of the Sensor's microcomputer is the conversion and formating of TV data into digital words for transmission to the central Controller.

When the registration process is successfully completed, the Controller commands each sensor to start a complete volumetric scan to obtain the 3D data of the room surfaces. Once initiated, scan control is local to each sensor. The sensor's laser beam is projected against the surface and its position on that surface tracked by the sensors' TV camera. The 3D position of the surface is uniquely determined, through triangulation, by the angular direction of the projected laser beam and the angular position of the projected image as sensed by the sensor's TV. These angles are a function of the following parameters:

(a) projector and camera scanning mirror positions (b) rotational position of optical assembly in yoke assembly (c) the precise position of the detected image in the TV's field of view.

Highly accurate angle encoders associated with the sensor's rotational axes provide the data in (a) and (b) above to the Controller via the sensor electronics 74. In addition, the sensor electronics detects the TV video and converts the image position from (c) above into digital coordinates which are also transmitted to the Controller. The Controller electronics serves to gather this data from all sensors and properly buffer and format it for transmission to the tape recorder 76.

The tape recorder may use standard 9-track tape. Formatting of data may be in 16 bit words (2-8 bit bytes) with parity bits for error detection. Data volume from a single room survey may require more than one tape reel for storage. When the tape is expended, the Controller automatically commands the Sensors to stop their scan patterns at the present position and notifies the operator of a required tape change. When the new tape is in place, the operator resets the system and the scanning process resumes where it left off.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention, and therefore, such adaptations should and are intended to be comprehended within the meaning and range of equivalence of the following claims.

What is claimed is:

1. A method for automatically obtaining three-dimensional position data on surfaces defining a room and objects therein, comprising the steps of: scanning the room with a plurality of sensors and determining with each sensor the three-dimensional profiles of surfaces visible to each sensor and relative to each sensor's position and orientation; measuring with each sensor the positions in space of at least three noncolinear reference points visible to all sensors for determining relative positions and orientations in space of the sensors, producing said three reference points by light projections from one of said sensors, each sensor having an individual coordinate system, each sensor measuring the positions of said three points relative to said individual coordinate system; transforming automatically data on room profile obtained by each sensor from relative position data during said measuring step into a single common coordinate system.

2. A method as defined in claim 1, and generating each reference point in space by projecting a light pattern onto a surface by one of the sensors; each other sensor locating said point by searching all space; measuring angular position of said point by each sensor; measuring the distance to said point by each sensor by measuring the distance to said surface after ceasing the original light projection; repeating the preceding steps at least the three times to provide sufficient geometric data for determining relative sensor position and orientation with an accuracy dependent on the number of points produced and measured.

3. A method as defined in claim 1, including the steps of: projecting a second pattern onto another surface in a different direction; and repeating in sequence said steps of searching, locating, terminating, and measuring, with respect to said second pattern.

4. A method as defined in claim 3, including the steps of: projecting a third pattern onto a further surface in a further different direction; and repeating in sequence said steps of searching, locating, terminating, and measuring with respect to said third pattern.

5. A method as defined in claim 1, wherein said points are pattern projected with a master projector.

6. A method as defined in claim 1, wherein said positions of said point are located by said slave sensors in terms of angular positions.

7. Apparatus for obtaining three-dimensional position data on surfaces defining a room and objects therein, comprising: master and slave sensors for scanning the room to determine three-dimensional profiles of surfaces visible to said sensors; slave sensors spaced from said master sensor; means for projecting a symbol onto a known surface; controller means communicating with all sensors and projecting means for commanding the projecting of said symbol in a predetermined direction and measuring the position of said symbol in space, said controller means commanding said slave sensors to search for said symbol and locate said symbol; memory means in said controller for storing three-dimensional position data of said symbol as determined by said slave sensors, said position data being relative to individual coordinate systems of each sensor; means connected to said memory means for calculating relative positions and orientations of all sensors based upon the positions of said symbol relative to each sensor, said calculating means transforming room profile data obtained by each sensor into a single common coordinate system from relative sensor positions and orientations.

8. Apparatus as defined in claim 7, wherein said sensors comprise: a tripod supporting a yoke assembly; optical means mounted on said yoke assembly and rotatable about a predetermined axis by drive means; electromagnetic projection means and TV camera means in said optical means, said camera having a line of sight and said projection means having a boresight directed towards opposite ends of said optical means; reflector means for directing said line of sight and said boresight towards a surface.

9. Apparatus as defined in claim 8, wherein said electromagnetic projection means comprises a laser source.

10. Apparatus as defined in claim 7, wherein the position of said symbol is determined angularly and the distance to said symbol is measured after projection of said symbol is terminated.

* * * * *